UNITED STATES PATENT OFFICE.

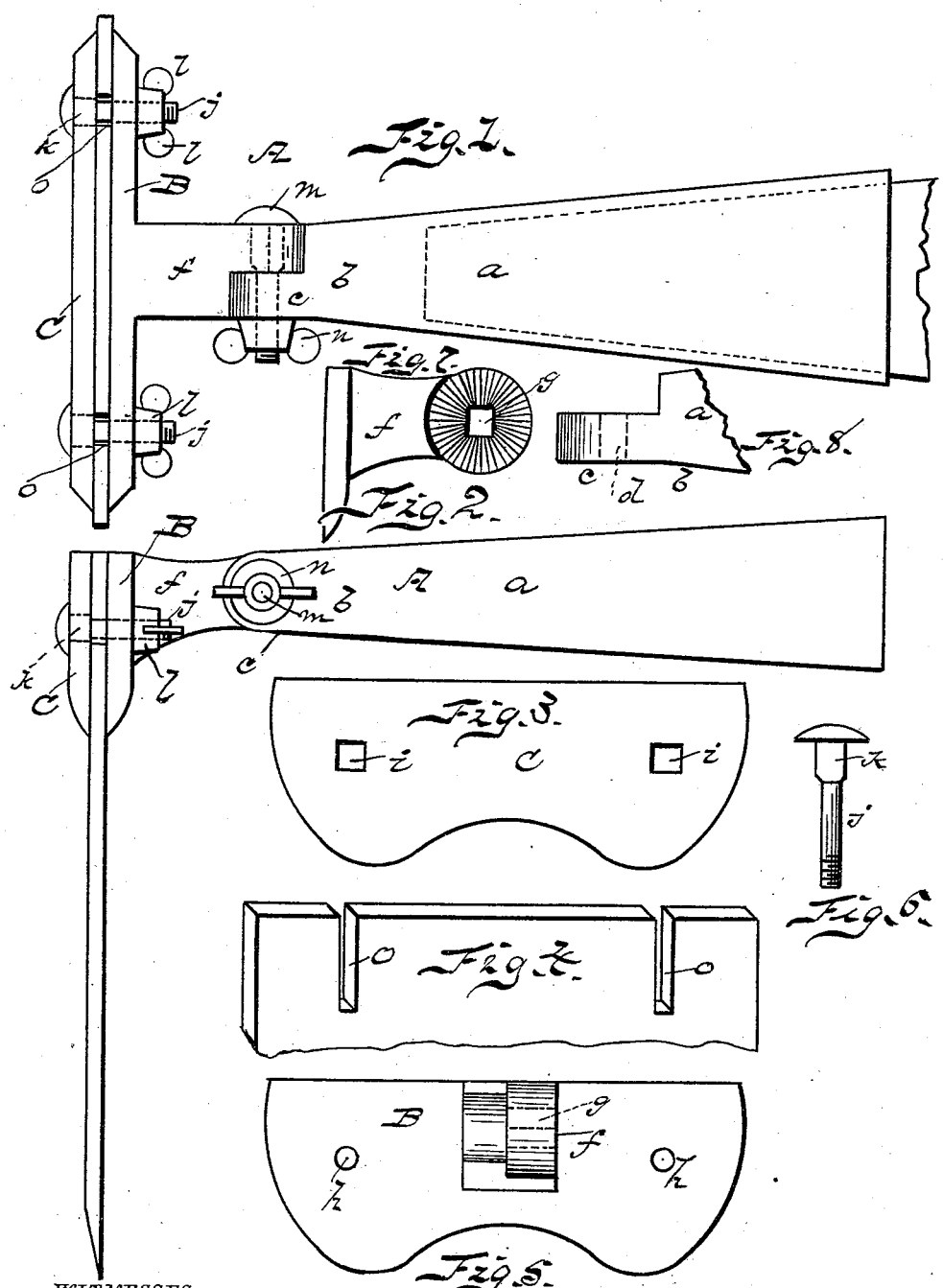

DITUS PINSON HEWITT, OF ROCKDALE, TEXAS.

FARM AND GARDEN IMPLEMENT.

SPECIFICATION forming part of Letters Patent No. 361,519, dated April 19, 1887.

Application filed January 31, 1887. Serial No. 226,107. (No model.)

*To all whom it may concern:*

Be it known that I, DITUS PINSON HEWITT, a citizen of the United States, residing at Rockdale, in the county of Milam and State of Texas, have invented certain new and useful Improvements in Farm and Garden Implements; and I do hereby declare the following to be a full, clear, and exact description of the invention, such as will enable others skilled in the art to which it appertains to make and use the same.

This invention relates to improvements in farm and garden hand-implements; and it consists in the novel construction and combination of parts, whereby the device may hold implements of various kinds—such as the hoe, rake, a fork, shovel-blade, a trowel, and similar hand-tools—by simply detaching one tool from the holder and inserting another, all as will be hereinafter fully described, and particularly pointed out in the claim appended.

The annexed drawings, to which reference is made, fully illustrate my invention, in which—

Figure 1 represents a top view of my device. Fig. 2 is a side view of the same; and Figs. 3, 4, 5, 6, 7, and 8 are detail views.

Referring by letter to the accompanying drawings, A designates the implement or tool holder, the portion $a$ of which represents a ferrule adapted to be applied to a rod or handle, which ferrule has a solid end, $b$, having an extended portion, $c$, which is transversely perforated, as at $d$, and a serrated inner face.

B represents a plate, the arm $f$ of which has a similar transverse perforation, as at $g$, and the inner face is also serrated, as shown. This plate is provided at each end with perforations $h\ h$, which register with square holes $i\ i$, formed in each end of the clamping-plate C, and said holes are designed to receive bolts $j\ j$, having square necks $k\ k$, whereby the same is prevented from turning when the thumb-nuts $l\ l$ are screwed up. The bolt $m$, carrying the thumb-nut $n$, also has a square portion to engage the square hole in the end of the arm $f$, thus preventing said bolt from turning.

It will be seen that when the blade which has the openings $o\ o$ is inserted between the two plates the thumb-nuts $l\ l$ are screwed home, and said blade or tool is rigidly but removably held in place in the holder, and can be applied or removed without removing one plate from the other, and the jointed portion permits the holder to be adjusted in different positions and held firmly in place by the bolt and thumb-nut $n$; and tools of various kinds can be attached to the holder—such as the hoe, rake, manure-fork, shovel, &c.—the same being provided with the openings at its upper end to allow the bolts to enter.

Having described my invention, what I claim, and desire to secure by Letters Patent, is—

In a tool-holder, the combination of the plate C, provided at each end with the square openings $i\ i$, plate B, provided with the perforations $h\ h$, and perforated arm $f$, the ferrule having the perforation $d$, bolts $j\ j\ m$, nuts $l\ l\ n$, and blade constructed with the open slots $o\ o$, the whole adapted to operate as described, and for the purposes set forth.

In testimony whereof I affix my signature in presence of two witnesses.

DITUS PINSON HEWITT.

Witnesses:
W. D. WELLS,
J. H. SPARKMAN.